US008063970B2

(12) United States Patent
Sekiguchi

(10) Patent No.: US 8,063,970 B2
(45) Date of Patent: Nov. 22, 2011

(54) IMAGE RECORDING/REPRODUCTION APPARATUS, INDEX DISPLAYING METHOD BY IMAGE RECORDING/REPRODUCTION APPARATUS, AND COMPUTER PROGRAM

(75) Inventor: Tomohiro Sekiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1015 days.

(21) Appl. No.: 11/355,876

(22) Filed: Feb. 16, 2006

(65) Prior Publication Data
US 2006/0197844 A1    Sep. 7, 2006

(30) Foreign Application Priority Data

Feb. 23, 2005    (JP) ................................. 2005-047795

(51) Int. Cl.
*H04N 5/222* (2006.01)
(52) U.S. Cl. ............................ 348/333.05; 348/333.01
(58) Field of Classification Search . 348/333.01–333.12
See application file for complete search history.

(56) References Cited

U.S. PATENT DOCUMENTS

| 5,973,734 | A  | * | 10/1999 | Anderson ...................... 348/239 |
| 6,538,698 | B1 | * | 3/2003  | Anderson ................. 348/333.05 |
| 6,868,192 | B2 | * | 3/2005  | Takiguchi ..................... 382/299 |
| 6,876,389 | B1 |   | 4/2005  | Honma ...................... 348/333.12 |
| 6,894,803 | B1 | * | 5/2005  | Haneda ........................... 358/1.2 |
| 7,342,604 | B2 | * | 3/2008  | Kito et al. .................. 348/231.2 |
| 7,529,420 | B2 | * | 5/2009  | Ii .................................. 382/240 |
| 2001/0033303 | A1 | * | 10/2001 | Anderson ..................... 345/854 |
| 2002/0135621 | A1 | * | 9/2002 | Angiulo et al. ............... 345/838 |
| 2003/0174217 | A1 | * | 9/2003 | Kito et al. .................. 348/231.2 |
| 2004/0061793 | A1 | * | 4/2004 | Fellegara et al. .......... 348/231.6 |
| 2004/0165789 | A1 | * | 8/2004 | Ii .................................. 382/299 |

FOREIGN PATENT DOCUMENTS

| JP | 08-201931    | 8/1996  |
| JP | 11-212755    | 8/1999  |
| JP | 2002-350965  | 12/2002 |
| JP | 2006-229291 A | 8/2006 |

OTHER PUBLICATIONS

Jeida, Digital Still Camera Image File Format Standard (Exif), Version 2.1, Jun. 12, 1998.*
The above reference was cited in a Dec. 22, 2009 Japanese Office Action of the counterpart Japanese Patent Application No. JP2005-047795.

* cited by examiner

*Primary Examiner* — Tuan Ho
*Assistant Examiner* — Mark Monk
(74) *Attorney, Agent, or Firm* — Cowan, Liebowitz & Latman, P.C.

(57) ABSTRACT

An image recording/reproduction apparatus reads image data from a recording medium storing plural image data to display the read image data on a TV monitor or the like, and selects image data of a same aspect ratio to simultaneously index display plural small images of thus selected image data on the TV monitor. Reduced images of an aspect ratio of 4:3 and 16:9 are formed respectively from image data of an aspect ratio of 4:3 and 16:9, and the number of displayed small image is changed according to the aspect ratio, thereby displaying a larger amount of information within a limited display space in an easily recognizable manner.

7 Claims, 5 Drawing Sheets

TRIMMING

IMAGE RECORDING/REPRODUCTION APPARATUS, INDEX DISPLAYING METHOD BY IMAGE RECORDING/REPRODUCTION APPARATUS, AND COMPUTER PROGRAM

BACKGROUND OF THE INVENTION

1. Field of the Invention

The present invention relates to an image recording/reproduction apparatus such as a digital camera or a digital video camera, an index displaying method by an image recording/reproduction apparatus, and a computer program therefor.

2. Related Background Art

In a digital camera for example, as a method of displaying image data recorded in a removable memory such as a memory card, there is known, in addition to an ordinary display method of displaying an image only, an index display method of simultaneously displaying a plurality of small images (thumbnail images) of the recorded image data.

Such index display is a function of simultaneously displaying small images of the image data recorded in the removable memory by (m×n) images (for example 6 images) or by (m×m) images (for example 9 images) for example. In such index display, it is important to display as much information as possible in an easily observable manner within a limited display space such as a liquid crystal panel incorporated in the digital camera or an external monitor (for example television).

Also there is known an image reproduction apparatus which, in response to a selection of a size of the small image to be displayed in an index display, determines a number of displayed images according to a screen (size and aspect ratio) of a monitor to be used for image display (cf. Japanese Patent Application Laid-Open No. H11-212755).

Owing to the high-vision television broadcasting started in earnest recently, television sets of a wider screen with a 16:9 aspect ratio are becoming popular in addition to those of conventional 4:3 aspect ratio. Also the digital cameras and the digital video cameras, capable of recording image data with an aspect ratio of 16:9 in addition to those of a 4:3 aspect ratio are becoming available. Therefore, a removable memory is often found to contain image data of plural aspect ratios in a mixed state.

Image data recorded by current digital cameras are principally JPEG image data of a format conforming with Exif (exchangeable image file format) standard. The Exif standard defines a file format constituted of a header, a thumbnail image part and a main image part, in which the thumbnail image part defines to record therein an image data of an image size of 160×120 pixels (aspect ratio 4:3). An index display on the digital camera is usually executed using such thumbnail image.

However, as to a file recorded with a 16:9 aspect ratio (1920×1080 pixels) of a main image, an index display is given by a thumbnail image of a 4:3 aspect ratio, displayed in a letter-box manner by attaching solid black areas above and below the image of the 16:9 aspect ratio.

Therefore, in an index display on a conventional image reproduction apparatus, an image of a 16:9 aspect ratio is displayed with a 4:3 aspect ratio in a letter-box style, as shown in FIG. 7, mixedly with ordinary images of a 4:3 aspect ratio. Consequently, the image portion of the image of the letter-box style, necessary for the user, is very difficult to recognize, since the image portion is displayed in a reduced form and the image is displayed in a letter-box style in a part thereof.

SUMMARY OF THE INVENTION

An object of the present invention is to provide an image recording/reproduction apparatus capable of displaying a larger amount of information within a limited display space and in an easily recognizable manner.

The above-mentioned object can be attained, according to the present invention, by an image recording/reproduction apparatus comprising a recording medium, on which plural image data are recorded, a display unit adapted to read the image data from the recording medium and display the read image data, and a selection unit adapted to select image data of a same aspect ratio from the image data, wherein plural small images of the image data selected by the selection unit are simultaneously index displayed on the display unit.

The present invention also provides an index display method for an image recording/reproduction apparatus capable of reading image data from a recording medium on which plural image data are recorded, and displaying the read image data on a display unit, in which the image recording/reproduction apparatus executes a step of selecting image data of a same aspect ratio from the image data, and a step of simultaneously index displaying plural small images of the image data selected in the selection step on the display unit.

The present invention also provides a computer program for controlling an image recording/reproduction apparatus capable of reading image data from a recording medium on which plural image data are recorded, and displaying the read image data on a display unit, the computer program causing a computer to execute a process of selecting image data of a same aspect ratio from the image data, and a process of simultaneously index displaying plural small images of the image data selected in the selection process on the display unit.

In the image recording/reproduction apparatus of the above-described constitution, in case of an index display of images stored in a recording medium which stores image data of different aspect ratios in a mixed manner, small images of a same aspect ratio only can be displayed with a layout matching the monitor, thereby displaying a larger amount of information within a limited display space in an easily recognizable manner.

The above and other objects, features and advantages of the invention will become more apparent from the following detailed description taken in conjunction with the accompanying drawings.

DETAILED DESCRIPTION OF THE PREFERRED EMBODIMENTS

In the following, a preferred embodiment of the present invention will be explained with reference to the accompanying drawings.

Figure 1:
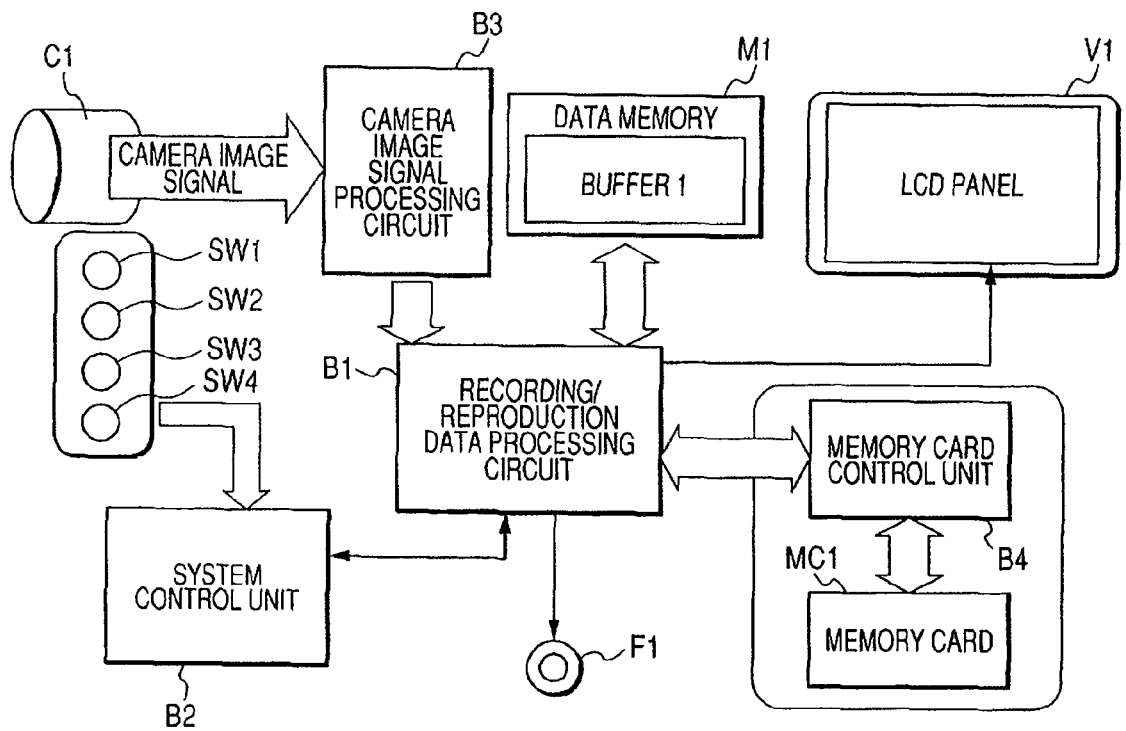
FIG. 1 is a block diagram showing a schematic configuration of an image recording/reproduction apparatus embodying the present invention.

FIG. 1 is a view showing a schematic configuration of an image recording/reproduction apparatus embodying the present invention.

In FIG. 1, there are shown a memory card MC1 capable of data recording and reproduction; and a memory card control unit B4 for controlling data writing into and data reading from the memory card MC1.

There are also shown an image capture unit C1 for capturing an image of an object and converting it into a camera image signal; a system control unit B2 for controlling various units; a camera image signal processing circuit B3 for processing the camera image signal obtained by the image capture unit C1; a recording/reproduction data processing circuit B1 for encoding the camera image signal, processed in the camera image signal processing circuit B3, into JPEG data and decoding the JPEG data read from the memory card MC1; a liquid crystal panel V1 for displaying a captured image or a reproduced image; a data memory M1 for image data buffering at an image capture operation or an image reproducing operation; and an image output terminal F1 to an unillustrated television monitor.

There are further shown an image signal output switching switch SW1 for selecting the image signal output from an image signal of a 16:9 aspect ratio and an image signal of a 4:3 aspect ratio; a display change-over switch SW2 for switching an ordinary one-image display screen and an index display screen; an image capturing switch SW3; and a recorded image change-over switch SW4 for selecting the recording image size from 1920×1080 pixels (aspect ratio 16:9) and 1280×960 pixels (aspect ratio 4:3). Switching of the recorded image change-over switch SW4 allows to record images of a 16:9 aspect ratio and a 4:3 aspect ratio on the memory card MC1.

The recording/reproduction data processing circuit B1 generates an image signal to be outputted to the liquid crystal panel V1 and the television monitor. The image signal can be switched, by the image signal output change-over switch SW1, between (a) an image signal of a 16:9 aspect ratio and (b) an image signal of a 4:3 aspect ratio. The image signal (b) of a 4:3 aspect ratio is selected in case of output to an ordinary television monitor (with a 4:3 image size), and the image signal (a) of a 16:9 aspect ratio is selected in case of output to a wide television monitor (with a 16:9 image size).

Figure 2:
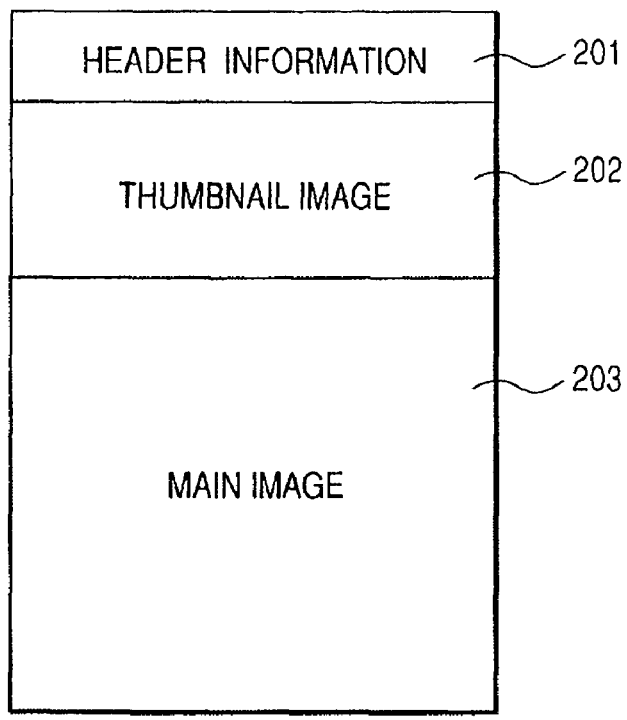
FIG. 2 is a view showing a file structure of an image data file.

FIG. 2 shows a file structure of the image data file. The image recording/reproduction apparatus of the present embodiment employs an image data file conforming with the Exif standard, adopted in many digital cameras. The image data include a header information part 201, a thumbnail image part 202 and a main image part 203.

The main image part 203 stores recorded image data as data of JPEG format.

The thumbnail part 202 stores image data (thumbnail image data) obtained by reducing the image data of the main image part 203 into 160×120 pixels (aspect ratio 4:3).

Figure 3:
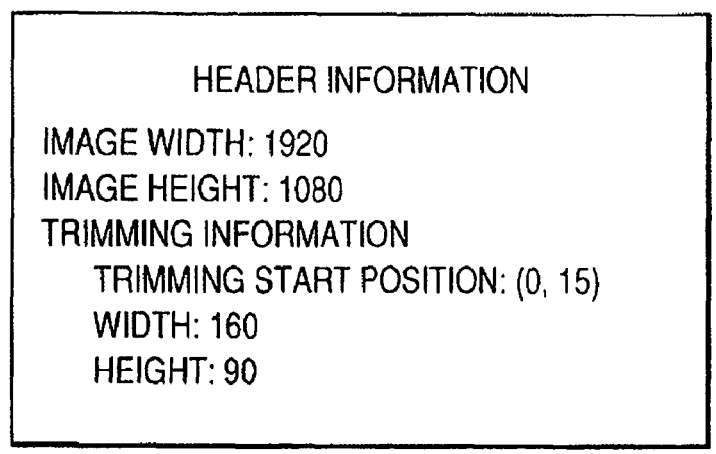
FIG. 3 is a view showing a header information.
Figure 4:
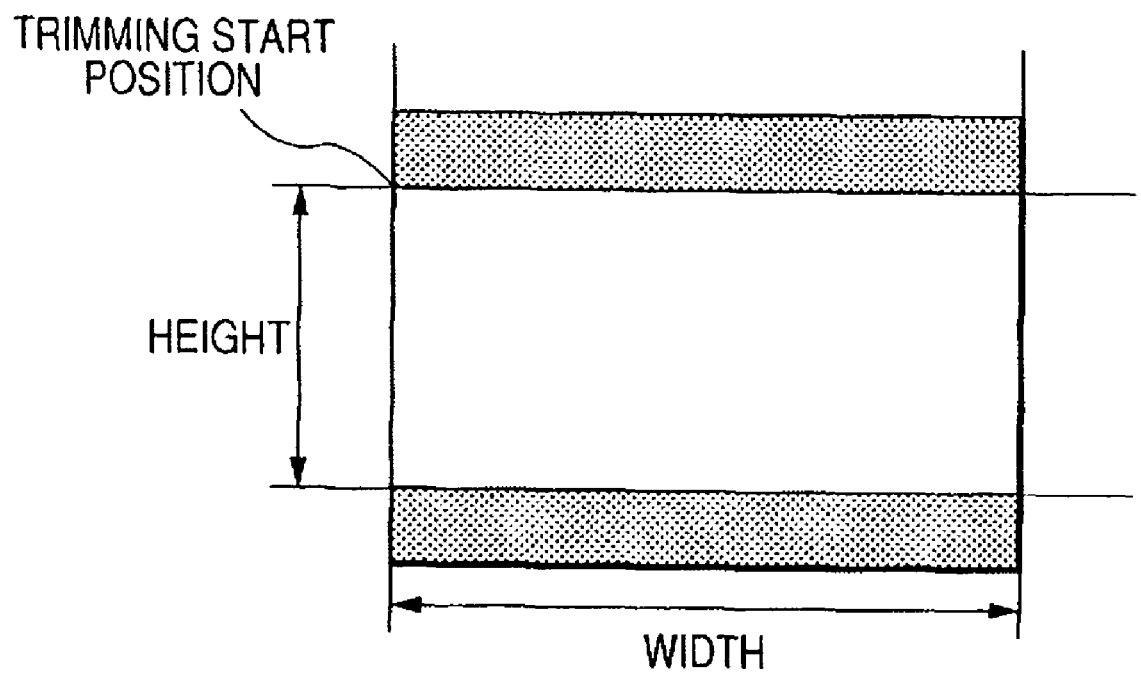
FIG. 4 is a view explaining a trimming process on a thumbnail image.

The header part 201 stores header information including an image width, an image height, a trimming information (trimming start position, width, height) etc. of the thumbnail image (cf. FIG. 3). In an example shown in FIG. 3, the header information indicates that the main image has a 16:9 aspect ratio (1920×1080 pixels). Based on the header information, the recording/reproduction data processing circuit B1 executes a trimming of the thumbnail image as shown in FIG. 4.

Figure 5:
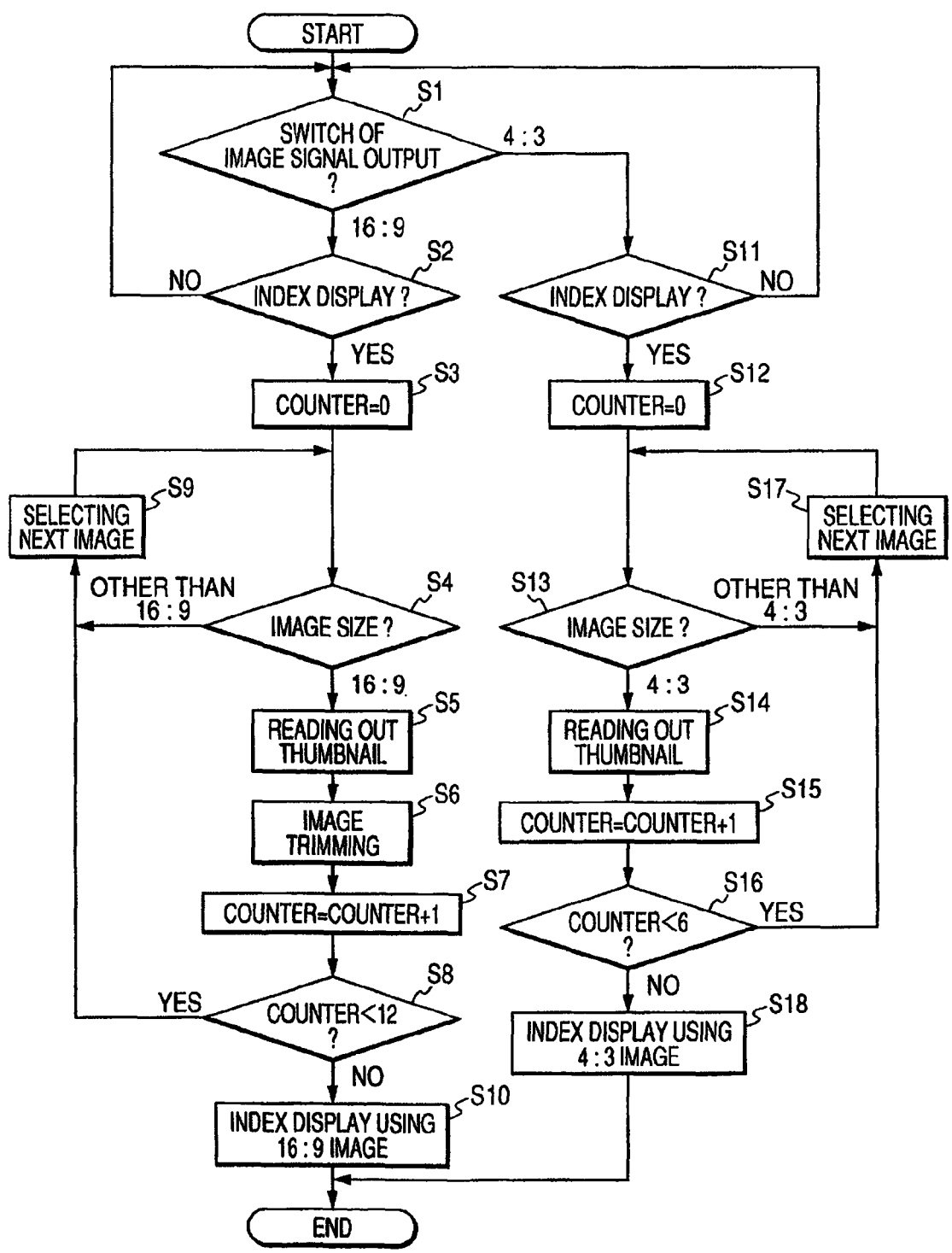
FIG. 5 is a flow chart showing operations in the image recording/reproduction apparatus embodying the present invention.

Now reference is made to FIG. 5 for explaining the operation of the image recording/reproduction apparatus of the present embodiment. At first, the image signal output change-over switch SW1 selects the aspect ratio of the image signal to be outputted to the liquid crystal panel V1 and the television monitor, between a 4:3 aspect ratio (in case of output to an ordinary television monitor (with a 4:3 image size)) and a 16:9 aspect ratio (in case of output to a wide television monitor (with a 16:9 image size)) (step S1).

At first there will be explained a case where the image signal output change-over switch SW1 selects an image signal output mode for a 16:9 aspect ratio. When the display change-over switch SW2 changes over to an index display mode (step S2), the operation shifts to an index display mode whereby a counter is set at 0 (step S3).

Then a size of an image to be displayed is discriminated based on "image width" and "image height" described in the header information part 201 (step S4), and, in case it is not an image of a 16:9 aspect ratio, the sequence proceeds to a selection of a next image (step S9).

In case the image is identified as an image of a 16:9 aspect ratio, thumbnail image data is read from the memory card MC1 to the data memory M1 (step S5). As explained above, the thumbnail image data has 160×120 pixels (aspect ratio 4:3) and is formed in a letter-box format by attaching solid black areas above and below the image of 16:9 aspect ratio. The thumbnail image data, developed in the data memory M1, are subjected to a trimming process of trimming only the image portion of the thumbnail image on the basis of the header information (step S6).

Then the counter value is incremented (step S7), and is discriminated whether it is smaller than "12" (step S8), and, if smaller than "12", a next image is selected (step S9).

Figure 6:
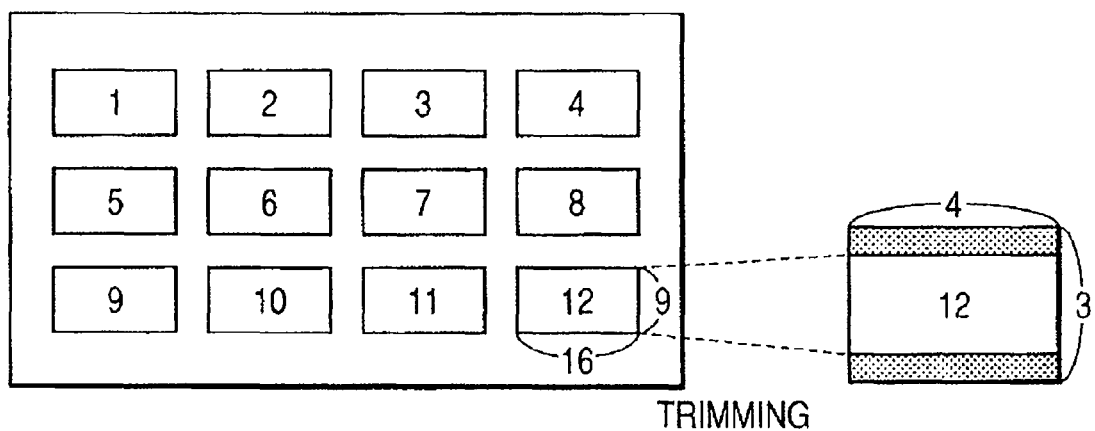
FIG. 6 is a view showing an index display image on a display with a 16:9 aspect ratio in the image recording/reproduction apparatus embodying the present invention.
Figure 7:
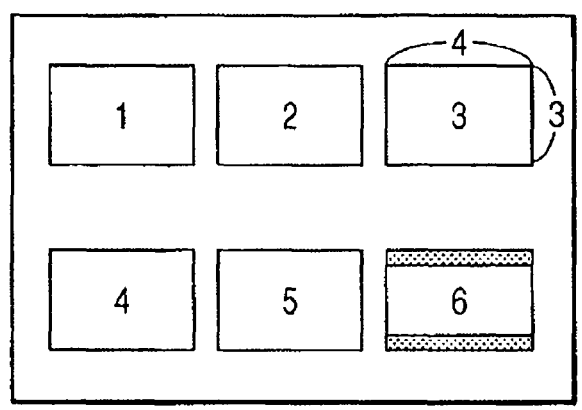
FIG. 7 is a view showing an index display image on a prior image reproduction apparatus.

Thus, in case of index display on a display screen with a 16:9 aspect ratio, the process of the steps S4 to S9 is repeated 12 times, and then the thumbnail image data with a 16:9 aspect ratio, generated by the recording/reproduction data processing circuit B1, are outputted to the liquid crystal panel V1 or the external monitor to execute an index display on the monitor as shown in FIG. 6 (step S10).

Now there will be explained a case where the image signal output change-over switch SW1 selects an image signal output mode for a 4:3 aspect ratio. When the display change-over switch SW2 changes over to an index display mode (step S11), the operation shifts to an index display mode whereby a counter is set at 0 (step S12).

Then a size of an image to be displayed is discriminated based on "image width" and "image height" described in the header information part 201 (step S13), and, in case it is not an image of a 4:3 aspect ratio, the sequence proceeds to a selection of a next image (step S17).

In case the image is identified as an image of a 4:3 aspect ratio, thumbnail image data is read from the memory card MC1 to the data memory M1 (step S14). As explained above, the thumbnail image data has 160×120 pixels (aspect ratio 4:3) and is used as it is.

Then the counter value is incremented (step S15), and is discriminated whether it is smaller than "6" (step S16), and, if smaller than "6", a next image is selected (step S17).

Thus, in case of index display on a display screen with a 4:3 aspect ratio, the process of the steps S13 to S17 is repeated 6 times, and then the thumbnail image data with a 4:3 aspect ratio is outputted to the liquid crystal panel V1 or the external monitor to execute an index display on the monitor (step S18).

In the present embodiment, the thumbnail image display of a 16:9 aspect ratio displays 12 images while the thumbnail image display of a 4:3 aspect ratio displays 6 images, but the number of displayed images is not limited to such example. A number of displayed images can be changed for example by the system control unit B2.

The object of the present invention can also be achieved by providing a storage medium storing program codes of a software realizing the functions of the aforementioned embodiments to a system or apparatus, reading the program codes by a computer (or a CPU or an MPU) of the system or the apparatus and executing the program.

In this case, the program codes themselves read from the storage medium realize the functions of the aforementioned embodiments, and the storage medium storing the program codes constitutes the present invention.

Further, the storage medium for supplying the program codes can be, for example, a flexible disk, a hard disk, an optical disk, a magneto-optical disk, a CD-ROM, a CD-R, a magnetic tape, a non-volatile type memory card, or a ROM.

Furthermore, in addition to the case where the functions of the aforementioned embodiments are realized by the execution of the read program codes by the computer, the present invention naturally includes also a case where an OS (operating system) or the like working on the computer performs entire processes or a part thereof in accordance with instructions of the program codes thereby realizing the functions of the aforementioned embodiments.

Furthermore, the present invention also includes a case where, after the program codes read from the storage medium are written in a memory provided in a function expansion card which is inserted into the computer or in a function expansion unit which is connected to the computer, and a CPU or the like contained in the function expansion card or the function expansion unit performs entire process or a part thereof in accordance with instructions of the program codes and realizes functions of the aforementioned embodiments.

The scope of the present invention is defined by the scope of the appended claims, and is not limited to only the specific descriptions in this specification. Furthermore, all the modifications and changes belonging to equivalents of the claims are considered to fall within the scope of the present invention.

This application claims priority from Japanese Patent Application No. 2005-047795 filed on Feb. 23, 2005, which is hereby incorporated by reference herein.

What is claimed is:

1. An image recording/reproduction apparatus comprising:
   a recording medium, on which plural image data of different aspect ratios are recorded with information of the aspect ratio of each of the plural image data;
   a display unit, adapted to read and display the read image data from the recording medium; and
   a selection unit, adapted to discriminate whether the image data recorded on the recording medium has a predetermined aspect ratio among the different aspect ratios, in accordance with the aspect ratio information recorded on the recording medium;
   wherein plural small images of the image data discriminated by the selection unit are simultaneously index displayed on the display unit.

2. An image recording/reproduction apparatus according to claim 1, wherein only the small images of the image data having a same aspect ratio are simultaneously index displayed.

3. An image recording/reproduction apparatus according to claim 2, wherein the small image of the image data having a first aspect ratio is trimmed so as to have the first aspect ratio so that the image data of the first aspect ratio and the small image thereof have the same first aspect ratio.

4. An image recording/reproduction apparatus according to claim 1, further comprising a changing unit, adapted to change a number of small images to be simultaneously index displayed.

5. An image recording/reproduction apparatus according to claim 1, wherein the plural image data recorded on the recording medium include the image data of an aspect ratio of 4:3 and the image data of an aspect ratio of 16:9.

6. An index display method for controlling an image recording/reproduction apparatus including a recording medium on which plural image data of different aspect ratios are recoded with information of the aspect ratio of each of the plural image data, comprising:
   a step of discriminating whether the image data recorded on the recording medium has a predetermined aspect ratio among the different aspect ratios, in accordance with the aspect ratio information recorded on the recording medium; and
   a step of simultaneously index displaying plural small images of the image data discriminated in the selection step on a display unit.

7. A computer readable program recorded on a computer readable storage medium, comprising a program code for causing a computer to execute an index display method set out in claim 6.

* * * * *